United States Patent Office 3,469,694
Patented Sept. 30, 1969

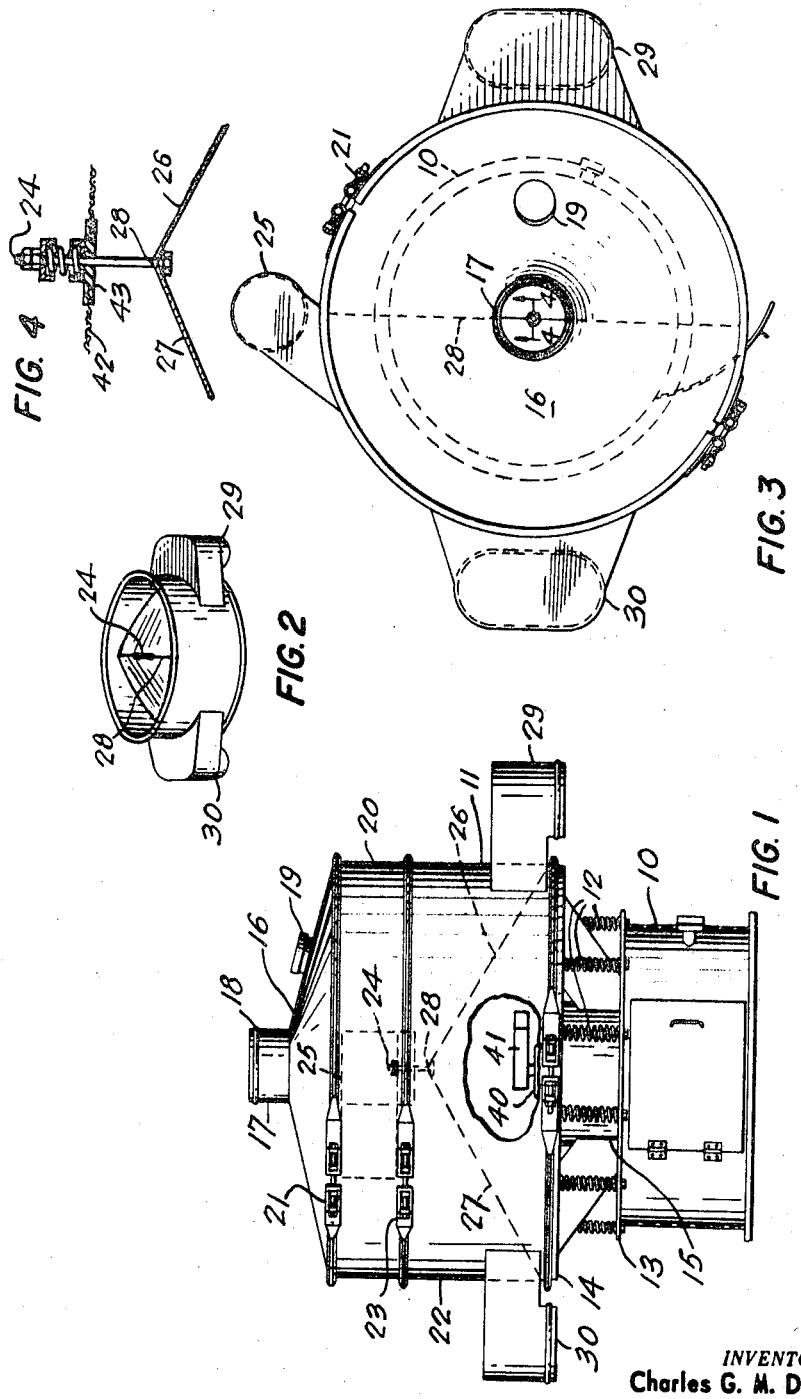

3,469,694
VIBRATORY SEPARATOR WITH SLOPING DISCHARGE DOME
Charles G. M. Dickson, Toronto, Ontario, Canada, assignor to Separator Engineering Ltd., Montreal, Quebec, Canada, a corporation
Filed Aug. 4, 1967, Ser. No. 658,473
Int. Cl. B07b 1/06
U.S. Cl. 209—255        5 Claims

ABSTRACT OF THE DISCLOSURE

Vibratory screen separators which have a horizontal screen mounted in a peripheral casing and means for vibrating the screen and casing. The vibration causes material delivered to the screen to be separated into a coarse fraction which is retained upon the screen and subsequently discharged and a fine fraction which is discharged after passing through the screen. In accordance with the disclosure the separator comprises guide means located beneath the screen for directing material which has passed through the screen to the outlets. The guide means includes surfaces sloping downwardly towards each outlet from an apex region located intermediate the outlets. The sloping surfaces are joined in the apex region along a straight line and each surface slopes downwardly from the straight line and toward the outlets.

Field of the invention

This invention relates to vibratory separators of the type in which a material is fed onto a horizontal screen mounted in a peripheral casing and the screen and casing are vibrated to separate the material into a coarse fraction which is retained upon the screen and discharged therefrom and a fine fraction which passes through the meshes of the screen and is discharged from a position below the screen.

Description of the prior art

Vibratory separators of this type are well known and the general principles of the operation are described, for example, in prior Canadian Patent Nos. 544,412 and 569,397 which issued on July 30, 1957, and Jan. 20, 1959, respectively in the names of Miller, Mathewson and Meinzer.

Summary of the invention

An object of the present invention is to provide the rate of discharge of material from a separator of the general type identified above.

According to the present invention, there is provided a separator comprising a casing, a horizontal screen mounted in said casing, inlet means leading to the part of the casing above the screen for feeding onto the upper surface of said screen material that is to be screened, means for vibrating said casing and said screen a pair of opposed outlets from said casing, said outlets being arranged beneath the level of said screen to receive material which passes through said screen, and guide means located beneath said screen for directing material passing through the screen to said outlets, said guide means including surfaces sloping downwardly towards each outlet from an apex region located intermediate said outlets.

Preferably, said element has a pair of surfaces, the boundary of each of which includes a straight edge, the straight edges of the surfaces lying along an apex line and each surface sloping downwardly from said line towards said outlets.

Brief description of the drawings

For a better understanding of the present invention, reference will now be made, by way of example, to the accompanying drawings in which:
FIG. 1 is a side elevation of a vibratory separator,
FIG. 2 is a perspective view to a reduced scale of a portion of the casing of the separator of FIG. 1,
FIG. 3 is a top plan view of the separator of FIG. 1, and
FIG. 4 is an enlarged view of part of FIG. 1 showing the tie-down arrangement.

Description of the preferred embodiment

The separator includes a stationary casing 10 upon which a further casing 11 is mounted by way of a plurality of supporting springs 12. The springs 12 are arranged in a circumferential array and extend between peripheral rims 13 and 14 of the casings 10 and 11 respectively. Attached to the casing 11 so as to be rigid therewith is a further casing 15, the casing 15 depending from the casing 11 and containing a motor 40 which imparts vibratory motions to the casing 11 and to the parts carried thereby.

The casing 11 is composed of a number of individual elements. An upper casing portion 16 includes an inlet 17 having a peripheral rib 18 which permits a flexible conduit (not shown) to be secured to the inlet 17 to feed the material to be graded or separated into the separator. An inspection port 19 is provided in the upper part 16. The casing portion 16 can, if desired, be omitted. Beneath the casing portion 16 is a screen frame 20 which is in the form of a cylindrical casing of relatively short vertical height. The frame 20 and the upper casing part 16 are secured together in conventional manner by a clamping ring 21, and the frame 20 and the next lower frame 22 are similarly clamped together by a clamping ring 23.

A screen 42 is clamped between the frames 20 and 22 at the level of the clamping ring 23. The manner in which the screen is secured does not form part of the present invention but, by way of example, the peripheral edges of the screen may be clamped between circular, peripheral rims of the frames 20 and 22. A centre tie-down bolt 24 is provided for the screen as will be described in more detail hereinafter.

The motor has its non-rotating portions fixed to the casing 15 and carries eccentric, adjustable weights 41 at each end of the rotary shaft thereof. Upon the motor being energized, the weights 41 induce in the casing 11 and the screen a combination of gyratory and oscillatory tilting movements, imparting to the material on the screen a series of resultant spiral impulses, facilitating separation and moving the coarse material remaining on the screen gradually towards and around the rim until it passes out at the outlet 25, as will be understood to those skilled in the art. It will be understood that, as the frame 20 and the outlet 25 are vibrating, the conduit (not shown) which is connected to the outlet 25 to receive screened material must be flexible.

The tie-bolt 24, as shown more clearly in FIG. 4, passes upwardly through an aperture in the ridge 28 and through an aperture in the screen 42. The screen rim adjacent the aperture is reinforced by embedment in a plastics material 43. The screen is clamped to the bolt through a compressor spring 44 held in cup shaped washers and retained by an adjusting nut and lock nut.

The material which passes through the screen impinges on one or other of two inclined plates 26 and 27 forming a guide element. Each plate 26 and 27 has a straight edge and these straight edges meet along an apex line 28 (see particularly FIG. 2) extending along a diameter of the frame 22. The plates 26 and 27 slope downwardly from the apex line 28 and it will be understood that the other edge of each plate is semi-elliptical and is in close contact with the internal wall of the frame 22 throughout its entire extent.

The opposed outlet spouts 29 and 30 are provided, with their center-lines lying on a diameter of the frame 22, this diameter being at right angles to the apex line 28.

The separator described is primarily intended for use in installations where only a minor portion of the material fed into the separator through the inlet 18 will be retained by the screen and discharged through the outlet 25. Examples are a dewatering separator where the solids content is low, or a "scalper" for removing oversized pieces or stray material. In installations such as these, the solids or liquids coming through the screen are considerable and the function of the plates 26 and 27 is to ensure that this material reaches the outlets 29 and 30 in the shortest possible time thereby to avoid "back-ups" of material within the casing part 22, such backups having an adverse effect on the efficiency of the screen.

What is claimed is:

1. A separator comprising a cylindrical casing, a horizontal circular screen mounted in said casing, inlet means leading to the part of the casing above the screen for feeding onto the upper surface of said screen material that is to be screened, means for vibrating said casing and said screen, a pair of opposed outlets from said casing, said outlets being arranged beneath the level of said screen to receive material which passes through said screen, and guide means located beneath said screen for directing material passing through the screen to said outlets, said guide means including flat surfaces sloping downwardly towards each outlet from an apex region located intermediate said outlets and also including a pair of similar surfaces each bound by a straight edge and a semi-elliptical edge, said straight edges being coincidental in defining said apex and said semi-elliptical edges being in contact with the inner surface of said casing.

2. A separator according to claim 1, wherein said apex region is in the form of a line extending across the casing between the pair of outlets.

3. A separator according to claim 1 wherein a tie-down for the center of said screen is mounted at the apex region of said guide means.

4. A separator comprising a cylindrical casing, a horizontal circular screen mounted in said casing for receiving on the upper surface thereof material which is to be separated or graded, means for vibrating said casing and said screen, a pair of diametrically opposed outlets from said casing, the outlets being arranged beneath the level of said screen to receive material which passes through said screen, and a guide element located beneath said screen for directing material passing through the screen to said outlets, said element having a pair of flat surfaces the boundary of each of which includes a straight edge, the straight edges of the surfaces lying along an apex line and each surface sloping downwardly from said line towards said outlets, said pair of surfaces each including semi-elliptical edges being in contact with the inner surface of said casing and said outlets at the lowest elevation area segment of said pair of surfaces.

5. A separator according to claim 4 wherein said apex line is perpendicular to a line extending through each of said outlets.

References Cited
UNITED STATES PATENTS

| | | | |
|---|---|---|---|
| 824,998 | 7/1906 | Monger | 209—315 X |
| 595,985 | 12/1897 | Wolf | 209—332 |
| 662,666 | 11/1900 | Burner | 209—257 |
| 726,172 | 4/1903 | Korab | 209—315 |
| 927,328 | 7/1909 | Cornwall | 209—316 |
| 2,950,819 | 8/1960 | Holman | 209—332 X |

FOREIGN PATENTS

| | | |
|---|---|---|
| 120,698 | 12/1959 | U.S.S.R. |
| 985,775 | 3/1965 | Great Britain. |

HARRY B. THORNTON, Primary Examiner

ROBERT HALPER, Assistant Examiner

U.S. Cl. X.R.

209—332

UNITED STATES PATENT OFFICE

CERTIFICATE OF CORRECTION

Patent No. 3,469,694                            September 30, 1969

Charles G. M. Dickson

It is certified that error appears in the above identified patent and that said Letters Patent are hereby corrected as shown below:

Column 1, line 51, "provide" should read -- improve --.

Signed and sealed this 17th day of March 1970.

(SEAL)
Attest:

Edward M. Fletcher, Jr.
Attesting Officer

WILLIAM E. SCHUYLER, JR.
Commissioner of Patents